United States Patent
Suzuki et al.

(10) Patent No.: US 7,297,386 B2
(45) Date of Patent: *Nov. 20, 2007

(54) ANTIREFLECTION STRUCTURE

(75) Inventors: Toshiyuki Suzuki, Shinjuku-Ku (JP);
Arimichi Ito, Shinjuku-Ku (JP);
Nobuhito Toyama, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/368,494

(22) Filed: Feb. 20, 2003

(65) Prior Publication Data

US 2005/0074579 A1 Apr. 7, 2005

(30) Foreign Application Priority Data

Feb. 20, 2002 (JP) ............................. 2002-043110

(51) Int. Cl.
*B32B 3/26* (2006.01)
*G02B 1/11* (2006.01)
*G02B 27/44* (2006.01)

(52) U.S. Cl. .................. 428/141; 428/156; 428/212; 428/220; 428/913; 313/461; 313/478; 313/479; 359/601; 359/613; 359/614; 359/609; 359/566; 359/569; 359/570; 359/574; 359/580; 359/582; 359/577

(58) Field of Classification Search ............. 428/141, 428/156, 212, 220, 913; 313/461, 478, 479; 359/601, 613, 614, 609, 566, 569, 570, 574, 359/580, 582, 577
See application file for complete search history.

(56) References Cited

U.S. PATENT DOCUMENTS 4,013,465 A * 3/1977 Clapham et al. ............... 430/11
4,131,488 A * 12/1978 Lesk et al. ..................... 438/71
4,944,986 A * 7/1990 Zuel ............................ 428/156
5,007,708 A * 4/1991 Gaylord et al. ............. 359/569
5,694,247 A * 12/1997 Ophey et al. ............... 359/566
5,817,396 A * 10/1998 Perlo et al. .................. 428/141
6,156,968 A * 12/2000 Nishimoto et al. ......... 136/252
6,327,086 B1 * 12/2001 Unno .......................... 359/565
6,388,372 B2 * 5/2002 Raj et al. ..................... 313/461
6,436,541 B1 * 8/2002 Sopko et al. ............... 428/432
6,528,142 B2 * 3/2003 Ikegaya et al. ............. 428/141
6,677,703 B2 * 1/2004 Ito et al. ...................... 313/478
2002/0044356 A1 * 4/2002 Arakawa et al. ............ 359/566
2002/0089750 A1 * 7/2002 Hoshi ......................... 359/566

* cited by examiner

*Primary Examiner*—William P. Watkins, III
(74) *Attorney, Agent, or Firm*—Oliff & Berridge, PLC (57) ABSTRACT

An antireflection structure (10) comprises a base (1), and a finely roughened antireflection part (2) formed in a surface of the base (1). The finely roughened antireflection part (2) includes a plurality of projections and depressions defined by the projections. The projections are distributed such that $P_{MAX} \leq \lambda_{MIN}$, where $P_{MAX}$ is the biggest one of distances between tips (2t) of the adjacent projections and $\lambda_{MIN}$ is the shortest one of wavelengths of visible light rays in a vacuum. The sectional area of each projection in a plane parallel to the surface of the base (1) increases continuously from the tip (2t) toward the bottom (2b) of the depression adjacent to the projection. The shape ($2_{Mt}$) of a tip part (Mt) of each projection in a plane perpendicular to the surface of the base (1) is sharper than the shape ($2_{Mb}$) of a bottom part (Mb) of each depression in the same plane vertical to the surface of the base (1).

21 Claims, 5 Drawing Sheets

ANTIREFLECTION STRUCTURE

TECHNICAL FIELD

The present invention relates to an antireflection structure to be used for various purposes including window panels for various displays, such as liquid crystal displays, to prevent reflection from the surfaces.

TECHNICAL FIELD

Reflection of light from a window panel disposed in front of a display unit employing a liquid crystal display or the like or from various optical devices often causes troubles. For example, in a portable telephone provided with a liquid crystal display (LCD) having a display panel, a window panel of transparent plastic plate is disposed in front of the surface of the display panel to protect the display panel of the LCD from water, dust and external forces (JP7-66859A).

The outer and the inner surface of the window panel disposed in front of the display panel reflect external light, which deteriorates the visibility of matters displayed on the display panel. Furthermore, part of light emerging from the display panel is reflected by the window panel toward the display panel, which reduces the efficiency of utilization of light emitted by the display panel and hence the visibility is deteriorated accordingly. Additional power is necessary to compensate for such deterioration of visibility, which is a significant problem in a portable telephone in which the reduction of power consumption is very important.

To solve such problems, it is general, as mentioned in JP2001-127852A, to coat a surface which reflects light undesirably, with a single film of a material having a low refractive index or with a multilayer antireflection film of a layer of a material having a low refractive index and a layer of a material having a high refractive index for an antireflection treatment, by, for example, an evaporation process, a sputtering process or a coating process.

An antiglare technique disclosed in, for example, JP9-193332A, finishes a surface of a window panel in a matte surface of a scale not shorter than the wavelengths of light to reduce regular reflection by diffusing light by the matte surface. This antiglare technique improves antiglare property and the reflection of the background scenery in the screen of a display can be prevented when the screen is viewed from a position right in front of it.

The antireflection film formed on the window panel by evaporation, sputtering or the like must be formed in a thin film having a specific refraction index and a thickness by a single or a plurality of batch processes, which causes problems in the stability of products and fraction defective. The productivity of a batch production system is low and hence the costs of products produced by the batch production system increases.

This known antiglare technique is unable to increase transmittance in proportion to the reduction of reflectance and hence unable to improve light utilization efficiency.

The applicant of the present invention patent application tried to use a technique disclosed in JP50-70040A that forms minute projections arranged at intervals not longer than the wavelengths of light in a surface to reduce reflective quality of the surface to solve problems in those prior art techniques for antireflection processing.

A minute projection forming method according to the technique disclosed in JP50-70040A coats a surface, to be processed for an antireflection process, of an optical member, such as a lens, with a photoresist film, exposes the photoresist film to light and develops the exposed photoresist film to form a resist pattern. Parts of the surface of the optical member not coated with the resist pattern are etched to form minute projections directly in the surface of each optical member.

This minute projection forming method, however, is inefficient, is unable to process workpieces at a productivity (mass-productivity) sufficient for producing industrial products. The applicant of the present patent application formed such minute projections in a surface of a glass plate to obtain a mother plate, and formed a master plate by transferring the pattern of the minute projections from the mother plate to a metal plate by a nickel electroforming process prevalently used by compact disk manufacturing lines. The applicant of the present patent application succeeded in achieving productivity effective for the mass production of industrial products by using the master plate.

The primary object of all the conventional techniques including the foregoing prior art techniques is to form minute projections at intervals not longer than wavelengths of light in a surface of a workpiece, and dimensional studies of the known techniques are concentrated on reducing dimensional elements, such as height and intervals, of minute projections. Thus, any studies of morphological factors defining the shapes of individual minute projections have not been made. The inventors of the present invention have studied morphological factors of minute projections with an intention to improve the antireflection property of a surface and have made the present invention.

DISCLOSURE OF THE INVENTION

Accordingly, it is an object of the present invention to improve the ability of an antireflection structure having a surface provided with minute projections capable of reducing useless reflection, improving the visibility of a displayed picture and enhancing the efficiency of display light.

According to the present invention, an antireflection structure comprises: a base having the shape of a flat plate; and a finely roughened antireflection part formed in a surface of the base; wherein the finely roughened antireflection part includes a plurality of projections and depressions defined by the projections, the projections are distributed such that $P_{MAX} \leq \lambda_{MIN}$, where $P_{MAX}$ is the biggest one of distances between the tips of the adjacent projections and $\lambda_{MIN}$ is the shortest one of wavelengths of visible light rays in a vacuum, the sectional area of each projection in a plane parallel to the surface of the base increases continuously from the tip of the projection toward the bottom of the depression, and a sectional shape tip of a tip part of each projection in a plane perpendicular to the surface of the base is sharper than that of a bottom part of each depression in the same plane vertical to the surface of the base.

In the antireflection structure according to the present invention, the finely roughened antireflection part meet inequalities: $n_b \geq 1$ and $P_{MAX} \leq \lambda_{MIN}/n_b$, where $n_b$ is the refractive index of the base.

In the antireflection structure according to the present invention, a section of the finely roughened antireflection part in a plane perpendicular to the surface of the base has a height H, a tip part of the section above a level at H/2 has a sectional area smaller than that of a bottom part of the section below the level at H/2.

In the antireflection structure according to the present invention, the tip part of the projection of the section above the level of H/2 has a width, at the level of H/2, smaller than that of the bottom part of the depression of the section below the level of H/2 at the level of H/2 in the plane perpendicular to the surface of the base.

In the antireflection structure according to the present invention, a section of the finely roughened antireflection part in a plane perpendicular to the surface of the base is formed of only curves.

In the antireflection structure according to the present invention, a section of the finely roughened antireflection part in a plane perpendicular to the surface of the base is formed of only straight lines.

In the antireflection structure according to the present invention, a straight line extends from the tip of the projection to the bottom of the depression.

In the antireflection structure according to the present invention, a polygonal line extends from the tip of the projection to the bottom of the depression.

In the antireflection structure according to the present invention, a sectional shape of each projection in a plane perpendicular to the surface of the base is symmetrical.

In the antireflection structure according to the present invention, a sectional shape of each depression in a plane perpendicular to the surface of the base is asymmetrical.

In the antireflection structure according to the present invention, the base and the finely roughened part are formed of the same material.

In the antireflection structure according to the present invention, the base has a main base part, and a surface base on the base part provided with the finely roughened antireflection part including the projections and the depressions.

The finely roughened antireflection part, having the minute projections, of the antireflection structure according to the present invention prevents the reflection of light by the surface of the antireflection structure. The antireflection effect of the finely roughened antireflection part of the antireflection structure, including the minute projections of a specified shape having a tip part sharper than a bottom part of a specified shape of of the adjacent depression, is superior to that of a surface provided with a finely roughened antireflection part including projections of a uniformly tapered shape or a shape in which a bottom part of the depression is sharper than a tip part the minute projection. To be brief, the reason why the finely roughened antireflection part prevents the reflection of light, is the effect of minute projections arranged at intervals shorter than wavelengths of light on a surface of a structure to make the refractive index at the interface between air and the surface of the structure change gradually and continuously. Thus, reflection of light, which is a phenomenon that occurs when refractive index changes suddenly discontinuously, can be prevented.

The antireflection effect of the surface of the antireflection structure of the present invention provided with the finely roughened antireflection part is different from that of an antiglare matte surface that reflects light by specular scattering, and prevents reflection by changing refractive index gradually continuously at the interface of air and the antireflection structure. Therefore, the transmittance of the antireflection structure increases in proportion to the reduction of the refractive index thereof. Thus, when the antireflection structure is used as a window panel for a display screen of a display or the like, the visibility of the screen can be improved and the efficiency of the display light can be improved.

BEST MODE FOR CARRYING OUT THE INVENTION

Preferred embodiments of the present invention will be described with reference to the accompanying drawings.

Referring to FIGS. 1(A) to 1(C), an antireflection structure 10 in a first embodiment according to the present invention serving as a window panel is disposed in front of a liquid crystal display panel 10A. The antireflection structure includes a base 1, and a finely roughened antireflection part 2 formed in a surface of the base 1.

The finely roughened antireflection part 2 includes minute projections 2p each having a tip 2t, and depressions 2d formed between the adjacent minute projections 2p and each having a bottom 2b. The sectional area of each minute projection 2p in a plane parallel to the surface of the base increases continuously from the tip 2t toward the bottom 2b of the depression 2d as shown in FIG. 1(B). A shape $2_{Mt}$ of a tip part 2Mt of each minute projection 2p in a plane perpendicular to the surface of the base 1 is sharper than a shape $2_{Mb}$ of a bottom part 2Mb of each depression 2d in the same plane perpendicular to the surface of the base 1.

The finely roughened antireflection part 2 including the minute projections 2p and depressions 2d having the foregoing shapes improves the antireflection effect of the base 1.

Figure 5:
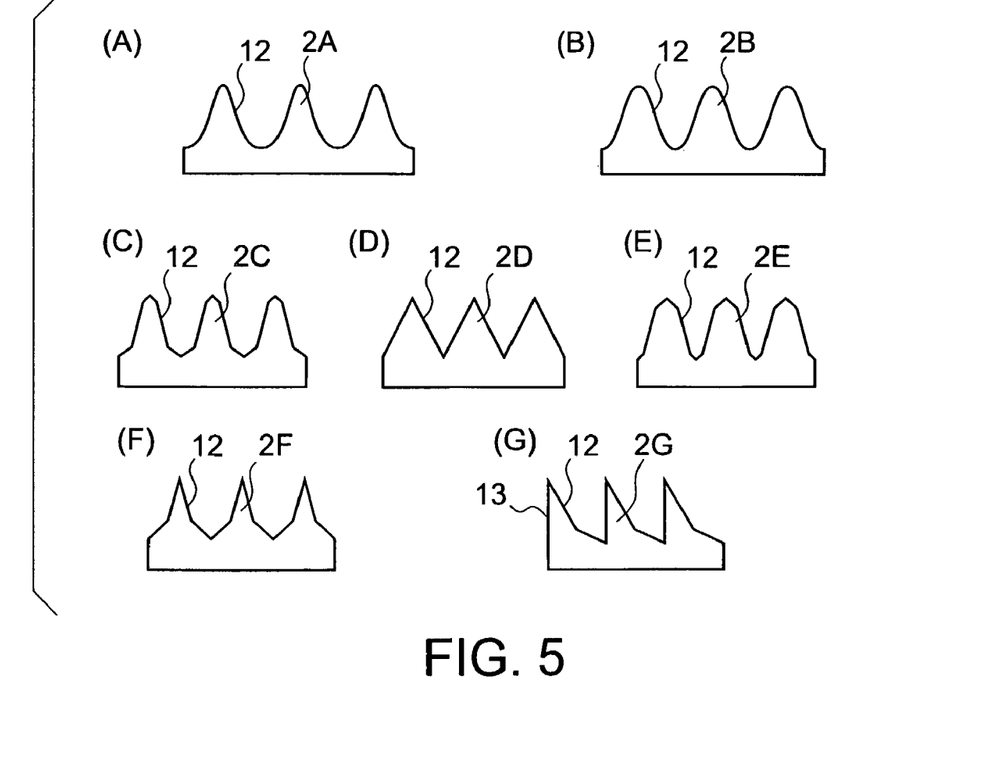
FIGS. 5(A) to 5(G) are schematic views of assistance in comparatively explaining shapes of minute projections in a plane perpendicular to the surface of a base.

To put it plainly, tip parts 2Mt of projections 2p and bottom parts 2Mb of depressions 2d of a sinusoidal wave or a triangular wave have the same sharpness. Tip parts Mt or bottom parts Mb may have a triangular sectional shape (projections having the shape of a circular cone) as shown in FIG. 5(D), and tip parts Mt or bottom parts Mb may have a round sectional shape in some other finely roughened antireflection parts.

The minute projections 2p are parts of the base 1, and the depressions 2d are spaces between the adjacent minute projections 2p; that is, the shape $2_{Mt}$ is the shape of a part of the base 1 and the shape $2_{Mb}$ is the shape of a space between the adjacent projections.

The antireflection function of the finely roughened antireflection part 2 of the antireflection structure of the present invention is different from that of a conventional antireflection structure having a matte surface provided with protrusions of sizes greater than wavelengths of light, which provides an antireflection effect by specular scattering of light. Since the finely roughened antireflection part 2 of the present invention reduces the reflectance of the antireflection structure 10 by the minute projections 2*p* arranged at intervals shorter than the wavelengths of visible light rays, the transmittance can be improved in proportion to the reduction of reflectance.

In a sectional shape of the finely roughened antireflection part 2 in a plane perpendicular to the surface of the base 1 may be a curved wavy form similar to a sinusoidal curve as shown in FIG. 1(B), may be a polygonal wavy form, in which the tip 2*t* of the minute projection 2*p* and the bottom 2*b* of the adjacent depression 2*d* is connected by a straight line or a polygonal line, or may be a wavy form including the curved wavy form and the polygonal wavy form in combination. The sectional shape of the minute projections 2*p* in a plane parallel to the surface of the base 1 may be circular or may be any optional shape.

Figure 1:
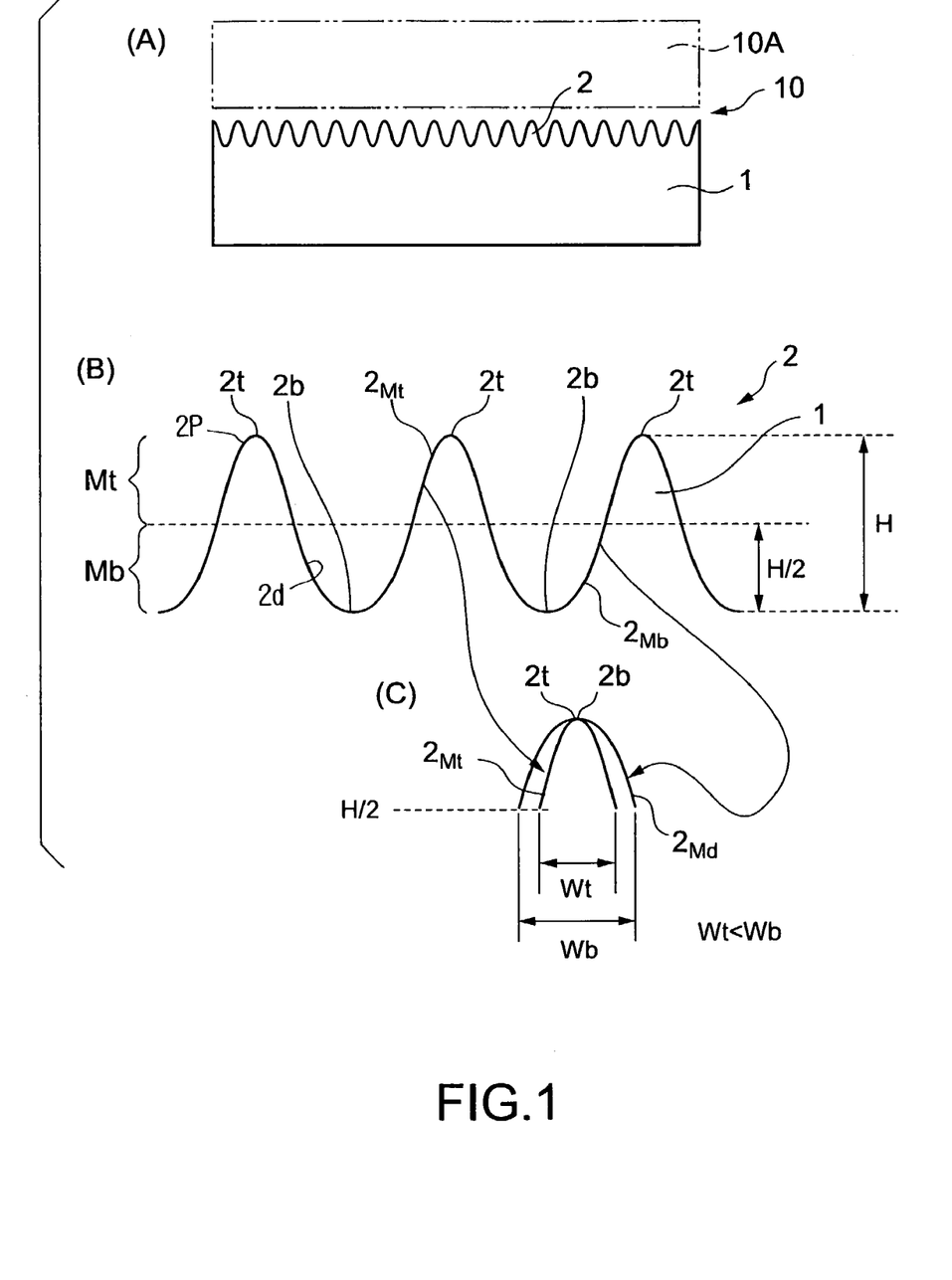
FIGS. 1(A), 1(B) and 1(C) are diagrammatic views of assistance in explaining an antireflection structure in a first embodiment according to the present invention.

Although the antireflection structure 10 shown in FIG. 1 is flat, the antireflection structure 10 may be curved. In an antireflection structure in a modification, two finely roughened antireflection parts may be formed on both the major surfaces of a base, respectively.

Finely Roughened Antireflection Part

The finely roughened antireflection part 2 has the antireflection effect for the following reasons.

The finely roughened antireflection part 2 prevents the sudden, discontinuous change of refractive index between the base 1 of the antireflection structure 10 and the environment (air) and make refractive index change gradually and continuously. Reflection of light is a phenomenon caused to occur by sudden, discontinuous change of refractive index at the interface between substances. Therefore, reflection of light by the surface of the antireflection structure 10 can be reduced by making refractive index change spatially continuously around the surface of the antireflection structure 10.

Although the base 1 usually is transparent and transmissive to light, the antireflection structure has an antireflection effect of reducing surface reflection even if the base 1 is opaque.

Reasons that the finely roughened antireflection part 2 formed on the surface of the base 1 has the antireflection effect will be described on an assumption that the base 1 is transparent.

Figure 2:
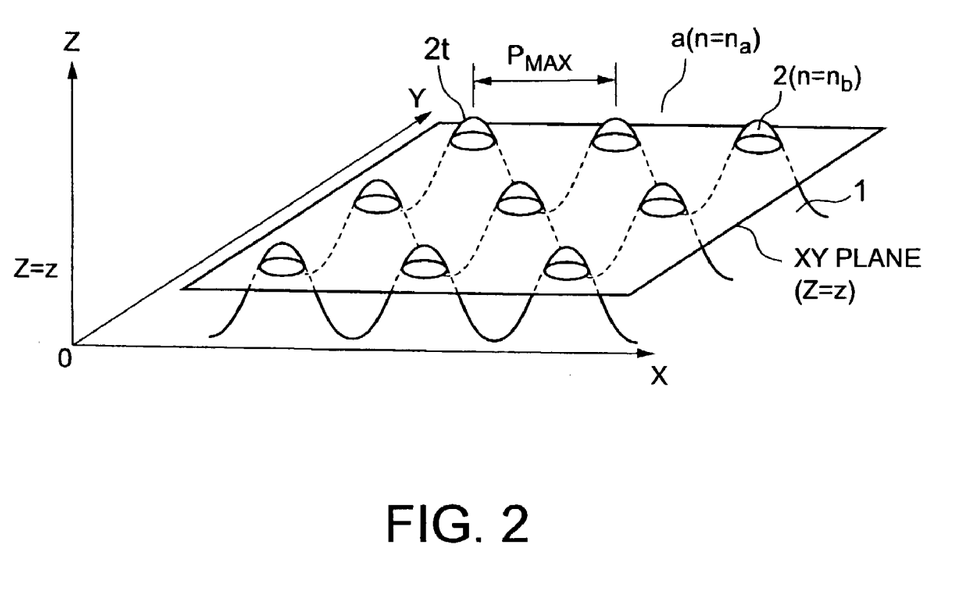
FIG. 2 is a diagram of assistance in explaining the distribution of effective refractive index determined by minute projections.

FIGS. 2 to 5 are conceptional illustrations of the distribution of refractive index determined by the finely roughened antireflection part 2 formed in the surface of the base 1. In FIG. 2, the sharpness of the minute projections of the finely roughened antireflection part 2 characteristic of the present invention is not precisely delineated for simplicity.

Referring to FIG. 2, the base 1 of the antireflection structure 10 extends in a space where Z≦0, and the finely roughened part 2 having the minute projections 2*p* is formed on an XY-plane where Z=0 so that the minute projections 2*p* projects in a direction parallel to the Z-axis.

The interval $P_{MAX}$ between the adjacent tips 2*t* of the minute projections 2*p* are not longer than the shortest wavelength $\lambda_{MIN}$ among the wavelengths of visible light rays in a vacuum. Therefore, the respective refractive indices of the media, i.e., the antireflection structure 1 and air with respect to light fallen on the finely roughened antireflection part 2 are spatially distributed. However, since the size of distribution of the projections 2*p* is not greater than the relevant wavelength, the distributed refractive indices do not act directly on light but averaged refractive indices act on light. Thus, the reflection of light can be prevented when the averaged refractive index, i.e., effective refractive index, changes continuously with the distance of travel of light.

The interval $P_{MAX}$ is the longest one of distances between the tips 2*t* of the adjacent minute projections 2*p* of the finely roughened antireflection part 2. The minute projections of the finely roughened antireflection part 2 may be formed so that the tips 2*t* are arranged regularly at equal intervals, or may be formed so that the tips 2*t* are arranged irregularly at different intervals.

An orthogonal coordinate system shown in FIG. 2 has a Z-axis perpendicular to the surface of the base 1, and an X-axis and a Y-axis extending perpendicularly to each other in a plane perpendicular to the Z-axis. Suppose that light fallen on the base 1 is traveling through the base 1 in a direction parallel to the Z-axis toward the side of negative values for Z and reaches a plane at Z=z parallel to an XY-plane defined by the X- and the Y-axis.

Figure 3:
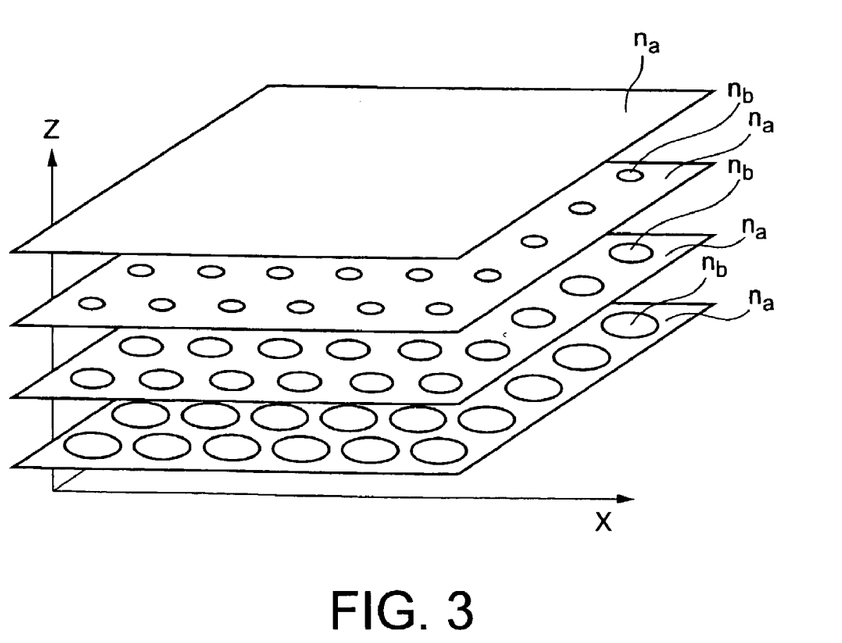
FIG. 3 is a diagram of assistance in explaining the distribution of effective refractive index determined by minute projections.

Since the finely roughened antireflection part 2 is formed on the surface of the base 1, an apparent refractive index of the medium has a distribution f(x, y, z) in the plane parallel to the XY-plane; that is, parts of the base 1 has a refractive index $n_b$ on the order of 1.5, and spaces a filled with air between the minute projections have a refractive index na on the order of 1.0 as shown in FIG. 3.

Actually, the mean refractive index determined by averaging a refractive index distribution of a spatial scale smaller than the wavelength of light (the minimum wavelength $\lambda_{MIN}$ among the wavelengths of light rays when light has a wavelength distribution) affect the light. Consequently, the effective refractive index $n_{ef}$, i.e., the mean refractive index, is equal to the integral of the refractive index distribution f(x, y, z) in the plane parallel to the XY-plane.

$$n_{ef}(z) = \int \int f(x,y,z) dx dy \tag{1}$$

Figure 4:
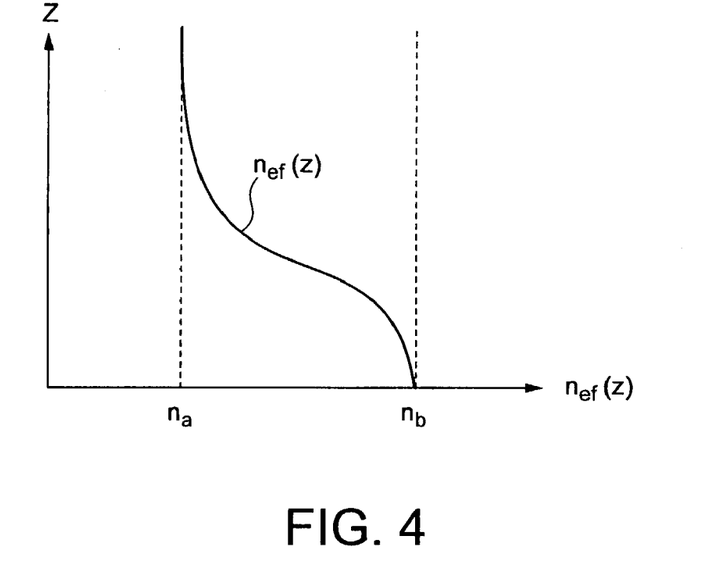
FIG. 4 is a graph showing a distribution of effective refractive index determined by minute projections.

Thus, as shown in FIG. 4, the distribution of the effective refractive index $n_{ef}$ is represented by a function of only z, i.e., $n_{ef}(z)$.

If the sectional area of the minute projections 2*p* of the finely roughened antireflection part 2 in a plane parallel to the XY-plane increases continuously from the tips 2*t* of the minute projections 2*p* to the bottoms 2*b* of the depressions 2*d*, the ratio of area between parts of the base 1 and parts filled with air changes continuously along the Z-axis. Consequently, the effective refractive index $n_{ef}(z)$ is a continuous faction of z.

Suppose that light travels from a first medium having a refractive index $n_0$ into a second medium having a refractive index $n_1$ and the light falls on the surface of the second medium at an incidence angle θ=0°, i.e., the light falls on the second medium perpendicularly to the surface of the second medium. Incidence angle is the angle formed by a ray of light arriving at a surface and the perpendicular to the surface at the point of arrival of the ray of light on the surface.

In this case, the reflectance R is not dependent on polarization or incidence angle, and is represented by Expression (2)

$$R = \frac{(n_1 - n_0)^2}{(n_1 + n_0)^2} \tag{2}$$

When the effective refractive index is represented by a continuous function of z, the effective refractive index $n_{ef}(z)$ at $Z=z$ is $n_0$, and the effective refractive index $n_{ef}(z+\Delta z)$ at $Z=z+\Delta z$ is $n_1$, $n_1 \rightarrow n_0$ if $\Delta z \rightarrow 0$, and hence, from Expression (2), $R \rightarrow 0$.

More rigorously, when light of a wavelength $\lambda$ travels in a medium having a refractive index n, the actual wavelength of the light is $\lambda/n$, which is generally shorter than $\lambda$. When the medium is air, the refractive index n of air is approximately equal to 1 and hence it is possible to consider that $\lambda/n \approx \lambda$. However, since the base 1 is formed usually of a material having a refractive index of about 1.5, such as a resin, the wavelength of the light of a wavelength $\lambda$ traveling through the base 1 is on the order of $0.7\lambda$. When such conditions are taken into consideration, the reduction of reflectance of the depressions 2d of the finely roughened antireflection part 2 by the averaging of refractive index can be expected if a condition: $P_{MAX} \leq \lambda_{MIN}$ is satisfied. If $\lambda_{MIN}/n_b \leq P_{MAX} \leq \lambda_{MIN}$, the effect of the projections 2p of the finely roughened antireflection part 2 on the reduction of reflectance by the averaging of refractive index cannot be expected at all.

However, the depressions 2d filled with air is effective in reducing reflectance, and therefore the finely roughened antireflection part 2 has an antireflection effect.

If the condition: $P_{MAX} \leq \lambda_{MIN}/n_b$ also is satisfied, both the depressions 2d and the minute projections 2p can meet a requirement that the interval $P_{MAX}$ is shorter than the shortest wavelength, the antireflection effect of the averaging of refractive index is perfect.

Suppose that $\lambda_{MIN}=380$ nm, i.e., the shortest one of the wavelengths in the waveband of visible light, and $n_b=1.5$. Then, $\lambda_{MIN}/n_b=250$ nm and hence $P_{MAX}$ may be 250 nm or below.

A first basic condition for the shape of the minute projections 2p of the finely roughened antireflection part 2 is that the sectional area of a section of each minute projection in a plane parallel to the XY-plane increases gradually continuously from the tip 2t thereof toward the bottom 2b of the depression 2d.

Thus, at least a part of the side surface of the minute projection must be oblique, i.e., at least a part of a section of the minute projection in a plane perpendicular to the surface of the base 1 is an oblique line. The minute projections 2p of the finely roughened antireflection part 2 may be such a minute projection as shown in FIG. 5(G) having an inclined line 12 and a vertical side surface 13. Preferably, the minute projections 2p have a shape such that the ratio of the sectional area of the minute projections 2p in a plane parallel to the XY-plane of the base 1 is converged to perfectly 0 in a plane including the tips 2t and is converged to perfectly 1 in a plane including the bottoms 2b, i.e., the surface of the base 1, such as those shown in FIGS. 5(A), 5(C), 5(F) and 5(G). Minute projections 2p, not shown, having a shape such that the ratio is converged to approximately 0 (minute projections having flat tips) in a plane including the tips 2t, and the ratio is converged to approximately 1 in a plane including the bottoms 2b are effective to some extent. The projections 2p of the finely roughened antireflection part 2 may be of any shape, provided that the foregoing conditions and the following second basic condition are satisfied.

Therefore, the sections of the side lines 12 of each minute projection 2p in a plane perpendicular to the surface of the base 1 may be defined by a straight line, a curve, a polygonal line or a combination of some of those lines.

The most preferable shapes of the finely roughened antireflection parts 2 to make the effective refractive index $n_{ef}(z)$ as the function of z change continuously from the refractive index $n_a$ of air to the refractive index $n_b$ of the base 1 are those shown in FIGS. 5(A) and 5(C). In each of the shapes shown in FIGS. 5(A) and 5(C), the ratio of the sectional area of the minute projections 2p in a plane parallel to the XY-plane and including the tips 2t of the base 1 is converged to 0, and the ratio of the sectional area of the minute projections 2p in a plane parallel to the XY-plane and including the bottoms 2b of the base 1 is converged to 1.

A second basic condition for the shape of the minute projections 2p of the finely roughened antireflection part 2 defines the sharpness of the tips 2t of the minute projections 2p and that of the bottoms 2b of the depressions 2d. As shown typical by a sectional view in FIG. 1(B), a shape $2_{Mt}$ of a tip part Mt of each projection 2p in a plane perpendicular to the surface of the base 1 is sharper than a shape $2_{Mb}$ of a bottom part Mb of each depression 2d in the same plane vertical to the surface of the base 1.

As shown in FIG. 1(B), a boundary line L between the tip parts Mt of the minute projections 2p and the bottom parts Mb of the depressions 2d is at a level equal to H/2, where H is the height of the finely roughened antireflection part 2 (of the minute projections 2p) from the surface of the base 1.

The expression: "tip parts Mt of the minute projections are sharper than the bottom parts Mb of the depressions" means that the shape $2_{Mt}$ of the tip part Mt is sharper than the shape $2_{Mb}$ of the bottom part Mb, as compared with the relation between the tip parts and the bottom parts of a sinusoidal wave or a triangular wave in which the tip parts and the bottom parts have the same shape.

FIGS. 1(B) and 1(C) are typical sectional views of the finely roughened antireflection part 2 taken on a plane vertical to the surface of the base 1.

In FIG. 1(C), the shape $2_{Mt}$ of the tip part Mt having the tip 2t and the shape $2_{Mb\ of}$ the bottom part Mb having the bottom 2b are superposed by inverting the shape $2_{Mb}$ of the bottom part $2_{Mb}$. As obvious from FIG. 1(C), the width Wt of the shape $2_{Mt}$ of the tip part $2_{Mt}$ on the boundary line L is smaller than the width Wb of the shape $2_{Mb}$ of the bottom part $2_{Mb}$ on the boundary line L, i.e., Wt<Wb.

The sharpness of the shape $2_{Mt}$ of the tip part Mt is that of the shape of a part of the base 1, and the sharpness of the shape $2_{Mb}$ of the bottom part Mb of the depression is that of a space between the adjacent minute projections; that is, the shape $2_{Mt}$ is the shape of a part of the base 1 and the shape $2_{Mb}$ is the shape of a space between the adjacent projections.

The sectional shape of the sharp tip part Mt having the tip 2b of the minute projection or the sharp bottom part Mb having a bottom 2b of the depression may be a triangle having a sharp tip part forming an acute angle (actual shape of the tip part Mt or the bottom part Mb is a circular cone, pyramid or the like) as shown in FIG. 5(C) or may be a triangle having a round tip part as shown in FIG. 1(B) or 5(A). Both the tip 2t and the bottom 2b may be sharp points, both the tip 2t and the bottom 2b may be round points, or either the tip 2t (the bottom 2b) or the bottom 2b (the tip 2t) may be a sharp point and the other may be a round point.

As mentioned above, among the finely roughened antireflection parts 2 according to the present invention which are the same in dimensional quality, i.e., in the intervals between the minute projections 2p and the height of the minute projections 2p, the finely roughened antireflection part 2 including the minute projections having the tip part Mt having the tips 2t and the shape $2_{Mt}$ sharper than the shape $2_{Mb}$ of the bottom part Mb having the bottoms 2b of the depressions 2d by a greater degree is more effective in reducing reflectance.

For example, the antireflection effect of the finely roughened antireflection part 2A shown in FIG. 5(A) and conforming to the present invention is higher than that of a finely roughened antireflection part 2B shown in FIG. 5(B) having tip parts Mt and bottom parts Mb of the same sharpness.

Although the effect of the difference in sharpness between the tip parts and the bottom parts is explained with reference to FIGS. 5(A) and 5(B) comparatively showing the finely roughened antireflection parts each having a sectional shape in a plane perpendicular to the base 1 formed only of curves similar to sinusoidal curves, the effect of the difference in sharpness is the same with finely roughened antireflection parts each having minute projections 2p having a triangular sectional shape in a plane perpendicular to the base 1. Although the shape of a section in a plane perpendicular to the base 1 of the minute projection has lines 12 each consisting of only at least two straight lines, the shape of the section is not a triangle in the strict sense of word, such a shape are generally triangular and hence such a shape will be referred to as a triangular shape.

When the respective reflectances of a finely roughened antireflection part 2C shown in FIG. 5(C) having tip parts Mt sharper than bottom parts Mb, a finely roughened antireflection part 2D shown in FIG. 5(D) having tip parts Mt of the same sharpness as bottom parts Mb, and a finely roughened antireflection part 2E shown in FIG. 5(E) having tip parts Mt less sharp than bottom parts Mb are compared, the order of the finely roughened antireflection parts 2C, 2D and 2E in the magnitude of reflectance is 2C<2D<2E. The finely roughened antireflection part 2C conforms to the present invention and the finely roughened antireflection parts 2D and 2E do not conform to the present invention.

It is most effective and most preferable that the finely roughened antireflection part of the present invention has the minute projections 2p and the depressions 2d formed such that the tip parts Mt are sharper than the bottom parts Mb as shown in FIGS. 5(A) and 5(C) in sectional shape in any one of planes perpendicular to the base 1 and extending in all directions. A finely roughened antireflection part having minute projections 2p and depressions 2d as shown in FIG. 5(A) or 5(C) formed such that the tip parts Mt of the minute projections 2p are sharper than the bottom parts Mb of the depressions 2d in sections in most planes perpendicular to the base 1, and the tip parts Mt is the same as the bottom parts Mb in sharpness or is less sharp than the bottom parts Mb as shown in FIG. 5(D) or 5(E) in sections in some planes perpendicular to the base 1 has a suitable effect.

Although the effect of the finely roughened antireflection part 2 having the tip parts Mt of the shape 2Mt sharper than the shape $2_{Mb}$ of the bottom parts Mb on the reduction of reflectance cannot clearly be explained, the effect of the finely roughened antireflection part 2 conforming to the present invention on the reduction of reflectance was proved by the computer-aided simulation of the antireflection performance of finely roughened antireflection parts respectively having different sectional shapes in a plane perpendicular to the base 1. The sectional shapes of the minute projections 2p of models of finely roughened antireflection parts used for the computer-aided simulation were those substantially resembling isosceles triangles like those shown in FIGS. 5(C), 5(D) and 5(E).

Although dependent on the fineness of the finely roughened antireflection parts, the reflectance of the finely roughened antireflection part 2C shown in FIG. 5(C) is 0.8%, while the reflectance of the finely roughened antireflection part 2D shown in FIG. 2(D) is 1.1%, and the reflectance of the finely roughened antireflection part 2C is less than that of the finely roughened antireflection part 2D by 28%.

Figure 6:
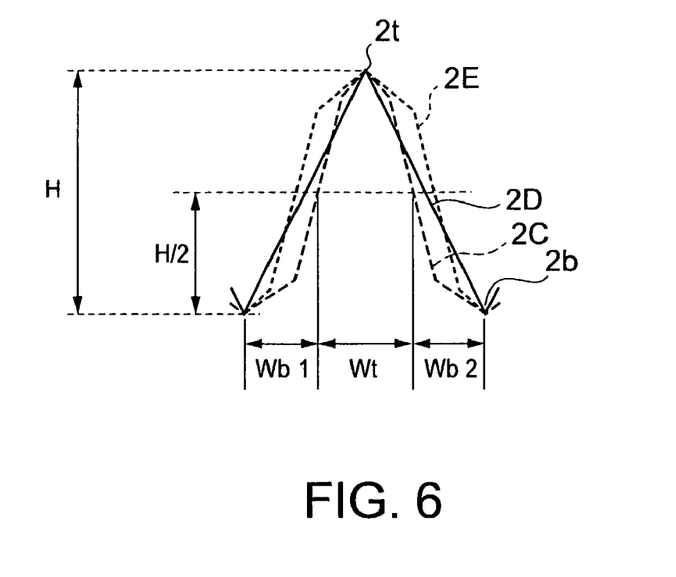
FIG. 6 is a diagrammatic view comparatively illustrating sections of minute projections in a plane perpendicular to the base.

FIG. 6 shows the minute projections 2p of the finely roughened antireflection parts 2C, 2D and 2E shown in FIGS. 5(C), 5(D) and 5(E) in an enlarged sectional view. In the finely roughened antireflection part 2D, the tip part Mt of the minute projection 2p and the bottom part Mb of the depression 2d have the same sharpness, and the tip 2t of the minute projection 2p and the bottom 2b of the depression 2d are connected by a straight line in a sectional shape. The width Wt of the section of the tip part Mt of the minute projection 2p of the finely roughened antireflection part 2C conforming to the present invention on a line at a level equal to H/2 is smaller than that of the section of the tip part Mt of the finely roughened antireflection part 2D on the same line. The width Wt of the section of the tip part Mt of the minute projection 2p on the line at the level equal to H/2 is greater than that of the bottom part Mb of the depression in the finely roughened antireflection part 2E where the bottom part Mb is sharper than the tip part Mt.

The shape of a section of the minute projections of the finely roughened antireflection part 2 in a plane parallel to the XY-plane may be any suitable shape, such as a circular, as shown in FIG. 2, oval, triangular, square, rectangular, hexagonal or polygonal shape. The shapes of sections of each minute projection 2p in different planes parallel to the XY-plane do not need to be similar shapes. A projection 2p of the finely roughened antireflection part 2 having a circular section in a plane parallel to the XY-plane and a section resembling an isosceles triangle in a plane perpendicular to the XY-plane has the shape of a circular cone. A projection 2p of the finely roughened antireflection part 2 having a circular section in a plane parallel to the XY-plane and a section resembling a triangle in a plane perpendicular to the XY-plane has the shape of an oblique circular cone. A projection 2p of the finely roughened antireflection part 2 having a triangular section in a plane parallel to the XY-plane and a section resembling an equilateral triangle in a plane perpendicular to the XY-plane has the shape of a triangular pyramid. A projection 2p of the finely roughened antireflection part 2 having a square section in a plane parallel to the XY-plane and a section resembling a triangle in a plane perpendicular to the XY-plane has the shape of a pyramid.

As mentioned above, the term "shape resembling an isosceles triangle" means shapes not exactly but substantially similar to an isosceles triangle like those shown in FIGS. 5(C) and 5(F).

Figure 7:
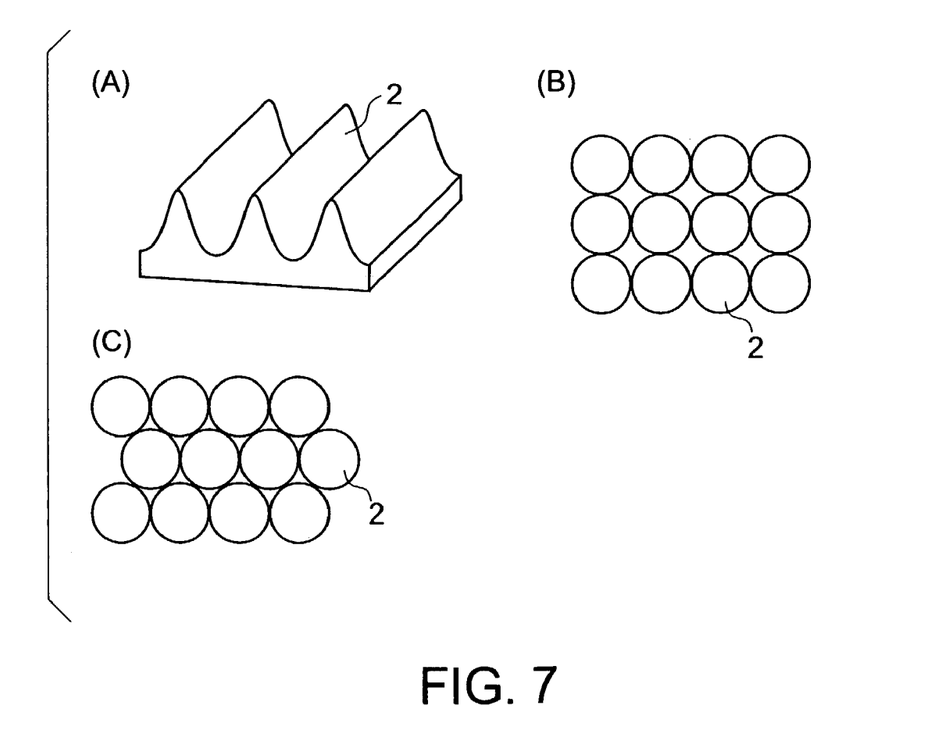
FIGS. 7(A), 7(B) and 7(C) are a perspective view, a plan view and a plan view, respectively, of minute projections.

The minute projections 2p of the finely roughened antireflection part 2 may be formed in a two-dimensional arrangement as shown in FIG. 2. The finely roughened antireflection part 2 may include ridges and furrows formed in an alternate, parallel arrangement as shown in FIG. 7(A) in a perspective view. The antireflection effect of the finely roughened antireflection part 2 shown in FIG. 7(A) is anisotropic and is dependent on the relation between the direction of extension of the ridges and furrows, and the direction of amplitude of the incident light wave. Finely roughened antireflection parts shown in FIGS. 2, 7(B) and 7(C), in which minute projections 2p are formed in a two-dimensional arrangement, are preferable because the antireflection effect of those finely roughened antireflection parts is isotropic.

Figure 8:
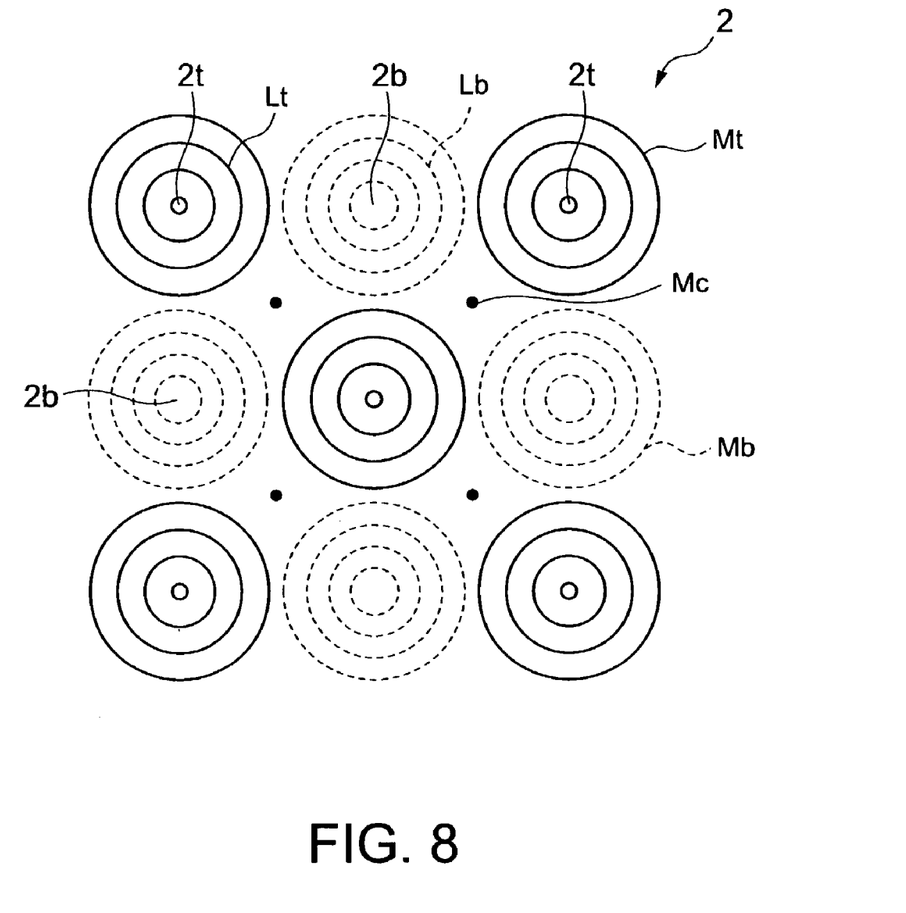
FIG. 8 is a plan view of minute projections.

A finely roughened antireflection part 2 as shown in FIG. 8 may be used. The finely roughened antireflection part 2 shown in FIG. 8 in a plan view includes tip parts Mt having tips 2t and rising from a base, and bottom parts Mb having bottoms 2b, sinking into the base and having a shape complementary to that of the tip parts, which are arranged alternately longitudinally and transversely. In FIG. 8, concentric circles Lt indicated by continuous lines are contour lines of the tip parts Mt, and concentric circles Lb indicated by dotted lines are contour lines of the bottom parts Mb.

According to the present invention, in the finely roughened antireflection part 2 shown in FIG. 8, the shape of the tip parts Mt and that of the bottom parts Mb are not exactly complementary to each other. Actually, the tip parts Mt are sharper than the bottom parts Mb.

In FIG. 8, indicated at Mc are curved parts of a shape resembling a ridge or a saddle. In FIG. 8, the concentric circles are not real contour lines in the strict sense of word; it is to be considered that the concentric circles are used to indicate the tip parts Mt and the bottom parts Mb. In the finely roughened antireflection part 2 shown in FIG. 8, the tip parts Mt and the bottom parts Mb have the shape of a circular cone and are formed in a two-dimensional arrangement as shown in FIG. 7(B).

In the foregoing finely roughened antireflection parts 2, the shapes of all the tips 2t and those of all the bottoms 2b may be identical or may be different from each other.

The height of the height H of the minute projections of the finely roughened antireflection part 2 is dependent on a desired reflectance reducing effect and the maximum one of the wavelengths of incident light rays in the waveband of visible light. Generally, the minimum value $H_{MIN}$ of the height H is in the range of about 100 to about 1000 nm. The finely roughened antireflection part 2 of the present invention has an antireflection effect even if the height H of the minute projections thereof is considered to be unsuitable for providing an antireflection effect from the teaching of prior art mentioned in JP50-70040A. The antireflection performance of the finely roughened antireflection part 2 according to the present invention is satisfactory even if the minimum value $H_{MIN}$ of the height H of the minute projections is 250 nm.

To give an actual example of the morphology and dimensions of the finely roughened antireflection part 2, the finely roughened antireflection part 2 has many minute projections having the shape of a circular cone having a sinusoidal section in a plane perpendicular to the surface of the base 1 and a circular section in a plane parallel to the surface of the base 1, formed in a regular two-dimensional arrangement with the tips 2t spaced at intervals $P_{MAX}$ in the range of 50 to 450 nm, and having the minimum height $H_{MIN}$ equal to 1.5 times the interval $P_{MAX}$.

Base

The base 1 is formed of a material selectively determined according to the purpose of the antireflection structure. Usually, the base 1 is formed of a material having a sufficient mechanical strength. There is not any particular restrictions on the material of the base 1. The conventional window panel is formed of a transparent material. The base 1 may be opaque if the purpose requires. An antireflection structure including an opaque base is used for preventing reflection of light by the surface of an opaque object.

Materials suitable for forming a transparent base are, for example, acrylic resins including polymethylmethacrylate resins, polyethyl methacrylate resins and copolymers of methyl methacrylate and butyl methacrylate, polypropylene resins, polymethylpentene resins, polyolefin resins including cyclic olefin polymers, such as norbornane resins ("Zenoa" commercially available from Nippon Zeon K.K., and "ARTON" commercially available from JSR K.K.), thermoplastic polyester resins including polyethylene terephthalate resins and polyethylene naphthalate resins, thermoplastic resins including polyamide resins, polystyrene resins, acrylonitrile-styrene copolymers, polyether sulfone resins, polysulfone resins, cellulose resins, vinyl chloride resins, polyether-ether ketone resins and polyurethane resins, and ceramic materials including glass.

The base 1 is formed in one of various shapes according to the use of the antireflection structure. For example, the base 1 may be a flat panel typically shown in FIG. 1(A). The base 1 may be a flexible sheet. The base 1 does not need necessarily to be rigid. The base 1 may be a three-dimensional solid. The antireflection structure 10 may be a three-dimensional solid. When the antireflection structure 10 is used as a window panel for a display, the antireflection structure 10 may have a flat antireflection part, and a rib surrounding the flat antireflection part. When the antireflection structure 10 is intended for use as a window panel for a display or such, the thickness of the flat base 1 is in the range of about 0.5 to 2 mm.

The finely roughened antireflection part 2 is formed by processing a portion of the base 1, and hence the finely roughened antireflection part 2 may be formed integrally with the base 1, and the base and the finely roughened antireflection part 2 may be formed of the same material as those of the antireflection structure 10 shown in FIG. 1(A).

Figure 9:
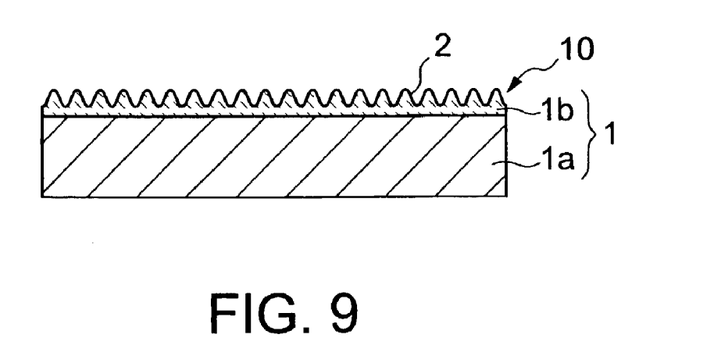
FIG. 9 is a side elevation of an antireflection structure in a second embodiment according to the present invention.

FIG. 9 shows an antireflection structure 10 in a second embodiment according to the present invention. The antireflection structure 10 shown in FIG. 9 includes a main base 1a, and a surface base 1b provided with a finely roughened antireflection part 2 in its surface, and is constructed by closely bonding together the main base 1a and the surface base 1b.

The base 1 and the finely roughened antireflection part 2 of the antireflection structure 10 in the first embodiment can be simultaneously formed by an injection molding process. The antireflection structure 10 in the second embodiment can be fabricated by forming the surface base 1b provided with the finely roughened antireflection part 2 on a desired surface of the main base 1a, such as a shaped glass or resin base, by a photopolymerization process, can be formed by an insert injection molding process, or can be formed, when both the main base 1a and the surface base 1b are formed of resins, by a two-color injection molding process. Those processes use a shaping mold having a finely roughened surface of a shape complementary to the finely roughened antireflection part 2.

Method of Fabricating Finely Roughened Antireflection Part Forming Die

A forming die for forming the finely roughened antireflection part 2 on the base will be described.

The finely roughened antireflection part can be formed on a shaped base 1 one at a time by a method disclosed in JP50-70040A. This method is suitable for forming a single antireflection structure or a small number of antireflection structures. This method takes time and increases costs when the same is applied to mass-producing antireflection structures. In view of producing antireflection structures at a high industrial productivity at low costs, it is preferable to form the finely roughened antireflection part 2 on the base 1 by a forming die.

It is more preferable to use a forming die fabricated by duplicating an original forming die by a duplicating process including one or a plurality of steps of pattern transfer and inversion than using an original forming die. First an original forming die, i.e., a mother plate, is fabricated, a duplicate forming die, i.e., a master plate, is formed by duplicating the original die by a duplicating process or by repeating a duplicating process several times, and the duplicate forming die is used as a working forming die for forming finely roughened antireflection structures 2. The method using such a forming die is excellent in respect of industrial productivity and cost, because, for example, another forming die can be readily made even if the working forming die is damaged.

Basically, there is not any particular restrictions on the original forming die, provided that the original forming die is provided with a part corresponding to the finely roughened antireflection part 2. The design of the original forming die is determined properly taking into consideration productivity and costs. A mother die making process is the first process of forming a structure for forming the finely roughened antireflection part 2. Fine processing techniques used in the semiconductor industry and including a pattern forming process that uses light, an electron beam or such for exposure. In forming a pattern on a substrate to fabricate a semiconductor device, the side walls of the component lines of the pattern may be perpendicular to the surface of the substrate and do not need to be oblique to the surface of the substrate. However, the side surfaces of the minute projections of the finely roughened antireflection part 2 of the present invention must be inclined so that the tip parts Mt of the minute projections are sharper than the bottom part Mb of the depressions.

Electron lithography is an example of a fine processing technique for an exposure process. A method of fabricating a mother plate provided with finely roughened antireflection part, using electron lithography will be described. A 1100 Å thick chromium film is formed on a surface of a quartz glass plate. A 4000 Å thick resist film is formed over the chromium film by a spin-coating process. A pattern is written in the resist film for exposure by using pattern data for a pattern of 300 nm mesh by an electron beam lithograph system. A writing condition is in the range of 5 to 8 $\mu C/cm^2$. The thus exposed resist film is subjected to a developing process using a developer. Thus, openings are formed in regions of the resist film specified by the writing data. Then, parts of the chromium film corresponding to the openings of the resist film are etched by a dry etching process using a chlorine etching gas to form openings corresponding to the openings of the resist film in the chromium film. A dry etching system "VERSALOCK 700" commercially available from Unaxis Co. may be used for the dry etching process. Then, the quartz glass plate is subjected to a dry etching process using the patterned resist film and the patterned chromium film as a mask, and fluoride gas to form a desired finely roughened shape. A dry etching system "MEPS-6025D" available from Nippon Shinku K.K. may be used for the dry etching of the Quartz glass plate.

There is a tendency that the tip parts of the minute projections become sharper than the bottom parts of the depressions when an electron beam of a high intensity is used for writing the pattern, and developing time is extended.

A laser lithography system may be used instead of the electron lithography system for writing a pattern in the resist film. The laser lithography system is able to use laser interferometry, which is applied to forming holograms and diffraction gratings. Although the components of a diffraction grating are formed in a one-dimensional arrangement, components of a pattern can be formed in a two-dimensional arrangement by exposing the film to the beam at different angles by a multiple exposure method.

A method of forming a mother plate using laser interferometry will be described by way of example. A resist, such as a photoresist "S1805" commercially available from Sipray Co., is spread by a spin-coating method on a surface of a glass plate to form a resist film. An exposure process is repeated twice to expose the resist film to a laser beam from two directions. Exposure energy in each exposure process is in the range of 80 to 200 mJ. The exposed resist film is subjected to a developing process using a 20 to 50% dilute developer prepared by diluting a developer, such as "Developer CONC" commercially available from Sipray Co. to form a mask of a pattern corresponding to a desired finely roughened antireflection shape.

There is a tendency that the tip parts of the minute projections are sharper than the bottom parts of the depressions by the intensification of developing conditions, such as increase of the concentration of the developer, extension of developing time and raising of developing temperature.

Generally, the minute projections of a finely roughened antireflection part 2 formed by using laser interferometry are arranged regularly. The electron beam lithography stores digital data representing pattern information about a predetermined pattern beforehand in a storage device, a scanning electron beam is controlled for on and off or the intensity of the scanning electron beam is modulated according to the pattern information. Therefore, the minute projections can be formed in either a regular arrangement or an irregular arrangement. Since the laser lithography and the electron beam lithography have both advantages and disadvantages, either the laser lithography or the electron beam lithography is used selectively taking design data, purpose, productivity and such into consideration.

A working forming die, i.e., a primary duplicate plate, is formed by duplicating the mother plate by a known method including the steps of forming a metal film, such as a nickel film, by a plating process, and removing the plated metal film from the mother plate (electroforming process). A secondary duplicate plate may be formed by forming a metal film by plating the primary duplicate plate with a metal, and removing the plated metal film from the primary forming plate. A forming die may be formed by repeating a duplicating process not less than twice. The forming die may be a plate, a sheet or a block. The shape of the forming die may be determined according to the shape and use of a desired antireflection structure. The forming die may be formed of a metal, such as nickel or a resin, such as a silicone resin. The forming die may be an elongate sheet of a resin.

A pattern of the primary duplicate plate is reverse to that of the mother plate, i.e., depressions and projections in the primary duplicate plate correspond to projections (tip parts Mt) and depressions (bottom parts Mb) in the motor plate. Therefore, when necessary, a pattern reverse to a desired pattern is formed in the mother plate.

The finely roughened antireflection part is formed in the base 1 by using the forming die by a known duplicating process, such as a hot pressing process (embossing process), an injection molding process, a photopolymerization process or a sol-gel transformation process.

Necessary methods including a method of laminating a finely roughened antireflection part forming sheet and a method of transferring the surface base 1b provided with a finely roughened antireflection part may be selectively determined according to the use of the antireflection structure, the material of the base and such.

Suitable processes of forming the finely roughened antireflection part in the base 1 are a hot-pressing process (embossing process), a photopolymerization process, a sol-gel transformation process, a patterned sheet laminating process and a pattern transfer process. The hot pressing process (embossing process) is used when the base 1 is formed of a plastic material, such as a thermoplastic resin. The photopolymerization process, the patterned sheet (plate) laminating process and the pattern transfer process can be used when the base 1 is formed of a heat-resistant inorganic material, such as glass.

The sol-gel transformation process (JP6-64907A) prepares a composition containing a metal alkoxide, and polyethylene glycol as a thickening agent, presses a forming die against a sheet of the composition while the sol is soft to form a finely roughened antireflection part on the sheet, and forms an inorganic sheet provided with the finely roughened antireflection part by drying and heat-treating the sheet.

The patterned sheet (plate) is formed by forming the finely roughened antireflection part in a resin sheet (plate) with the forming die. The patterned sheet (plate) is formed of one of the previously enumerated materials suitable for forming the base. The patterned sheet (plate) is bonded to the base with an adhesive or by welding.

The method of transferring the surface base 1*b* prepares a transfer sheet including a support sheet, and the surface base 1 (transfer layer) laminated to the support sheet. The surface base 1 is provided with a finely roughened antireflection part in its surface contiguous with the support sheet. The surface base 1*b* is transferred and bonded to the main base 1*a*. The support sheet of the transfer sheet is provided with a pattern complementary to the finely roughened antireflection part in its surface contiguous with the surface base 1*b*. The aforesaid patterned sheet is used as the support sheet. The surface base 1*b* is formed on the support sheet by coating the surface of the support sheet with a transparent resin dope of a thermoplastic resin, such as an acrylic resin, a thermosetting resin, such as a urethane resin, or a radiation-curable resin that hardens when exposed to ultraviolet rays or electron beams, such as an acrylate resin.

The finely roughened antireflection part can be formed in the base 1 simultaneously with the formation of the base 1 by an injection molding process or a photopolymerization process.

The injection molding process employs an injection mold having a forming surface of a shape suitable for forming the finely roughened antireflection part 2 to form the finely roughened antireflection part 2 by an injection molding process. Thus, the injection molding process is able to form the base 1 and the finely roughened antireflection part 2 simultaneously and is excellent in mass-productivity. The forming surface of the injection mold may be formed by attaching the formed plate formed by the aforesaid processes to the forming surface.

The base 1 and the finely roughened antireflection part 2 can be simultaneously formed by the photopolymerization process.

When the base 1 is a glass plate, the finely roughened antireflection part 2 may be formed simultaneously with the base 1 by a hot pressing process because the glass plate can be made plastic by heating.

An antireflection structure integrally including the base 1 and the finely roughened antireflection part 2 as shown in FIG. 1(A) can be formed by a hot pressing process (embossing process), an injection molding process or a photopolymerization process. An antireflection structure formed by laminating the transparent surface base 1*b* provided with the finely roughened antireflection part 2 in its surface to the main base 1*a* as shown in FIG. 9 can be formed by a two-color injection molding process, a photopolymerization process, a sol-gel transformation process, a patterned sheet (plate) laminating process or a patterned layer transfer process.

When the resin surface base 1*b* is formed by a photopolymerization process or the transfer process, it is preferable to form the surface base 1*b* of a hard resin to make the surface base 1*b* resistant to damaging. A suitable resin is a thermosetting resin, such as a urethane resin or an epoxy resin, or a radiation-curable resin, such as an acrylate resin.

When the surface base 1*b* provided with the finely roughened antireflection part 2 is formed on the main base 1*a*, an adhesive layer may be formed between the main base 1*a* and the surface base 1*b* when necessary. Such an adhesive layer may be formed of a known adhesive or a silane coupling agent.

Uses of Antireflection Structure

The antireflection structure 10 of the present invention may have any optional shape, such as a three-dimensional shape, a shape resembling a plate or a shape resembling a sheet. There are not any particular restrictions on the uses of the antireflection structure 10. It is the best that the finely roughened antireflection part 2 is protected from soiling and damaging because the finely roughened antireflection part 2 is a very fine structure. It is preferable that the finely roughened antireflection part 2 is not exposed to the environment and faces inside or placed inside a device. Possible uses of the present invention are not limited to those mentioned above by way of example.

For example, the antireflection structure 10 can be applied as a window panel to the windows of displays of various devices including portable telephones. A window panel, such as a resin panel or a resin molding, is disposed in front of a display panel 10A, such as a LCD panel, of a display unit for those devices. When the antireflection structure 10 is used as such a resin window panel, it is preferable that the finely roughened antireflection part 2 characteristic of the present invention faces inside to prevent the finely roughened antireflection part 2 from being damaged or soiled. The information display unit may be a mechanical means, such as a mechanical analog meter, typically a watch, other than the display panel 10A, such as a LCD panel.

The window panel may be a flat panel or may be provided with projections for facilitating assembling or from the aesthetic point of view.

Devices provided with an information display unit covered with a window include portable telephones, watches, personal computers, personal digital assistants (PDAs), such as electronic notes, electronic calculators, portable music players, such as CD players, DVD players, MD players and semiconductor memory type music players, electronic devices, such as Video tape recorders, IC recorders, video cameras, digital cameras and label printers, and electric appliances, such as electric rice cookers, electric water pots and electric washing machines.

The antireflection structure 10 having the shape of a flat plate or a sheet can be used as a transparent plate for a transparent touch panel. A transparent touch panel furnishes a display unit with an input function. However, a display panel, such as a LCD panel or a CRT, and the transparent touch panel are separate members and hence a gap is formed between the display panel and the transparent touch panel when the display panel and the transparent touch panel are assembled. Consequently, light is reflected. Reflection of light can be reduced by attaching the antireflection structure 10 having the finely roughened antireflection part 2 to inner surface of the transparent touch panel.

Transparent touch panels are used, for example, in PDAs, such as electronic notes, automotive navigation systems POS terminals, portable order entry devices, automatic teller machines (ATMs), facsimile terminals, stationary telephones, mobile telephones, digital cameras, video cameras, personal computers, displays for personal computers, television receivers, television monitors, ticket issuing machines, measuring instruments, electronic calculators, electronic appliances including electronic musical instruments, copying machines, business machines including electronic cash registers (ECRs), and electric appliances including washing machines and microwave ovens.

The antireflection structure 10 of the present invention is applicable to various optical devices, such as camera lenses, windows for the range finders of cameras, lenses for glasses, Fresnel lenses for overhead projectors, light-receiving windows for photosensors and binocular lenses, pickup lenses for reading signals from optical disks including CDs and DVDs, and exit windows for lasers.

EXAMPLES

The invention will be described in further detail in terms of concrete examples thereof.

Example 1

A base plate for a photomask was formed by forming a chromium film on a surface of a 152.4 mm (6 in.) square 6.35 mm thick synthetic quartz plate. A resist film was formed over the chromium film by spreading a positive EB resist ("ZEP7000", Nippon Zeon K.K.) by a spin coater. A mesh pattern having longitudinal and transverse pitches of 300 nm was written on the resist film on the basis of mesh pattern data for exposure, the exposed resist film was developed by using a predetermined developer to obtain a resist pattern having open meshes. Then, parts of the chromium film corresponding to the meshes of the resist pattern were etched through the resist pattern by a dry etching process to form openings in the chromium film. The dry etching process used a dry etching system "VERSALOCK7000" commercially available from Unaxis Co.

Subsequently, the base plate was etched by a dry etching process using the resist pattern and the chromium film as an etching mask, and fluorine gas as an etching gas to obtain a mother plate, i.e., a forming die, provided with a desired finely roughened antireflection part having minute projections having tip parts sharper than bottom parts of depressions formed between the adjacent minute projections.

A main base 1a for a flat, transparent antireflection structure 10 was formed by processing a 1 mm thick transparent acrylic resin plate. Then, a surface base 1b having a surface provided with a desired finely roughened antireflection part 2 was formed by a photopolymerization process on one surface of the main base 1a. More concretely, a w-curable resin layer of 2 g/m$^2$ was formed on one surface of the main base 1a by a potting process, the forming die was pressed against the UV-curable resin layer to spread the UV-curable resin layer over the surface of the main base 1a, the surface base 1b was formed by exposing the UV-curable resin layer to UV rays emitted by a high-pressure mercury lamp to promote the photopolymerization of the UV-curable resin, and then the forming die was removed from the surface base 1b to obtain an antireflection structure 10 as shown in FIG. 9 in a sectional view.

The dimensions of the finely roughened antireflection part 2 of the thus formed antireflection structure 10 were measured by using an interatomic force microscope. The height $H_{MIN}$ of the projections was 250 nm and the longitudinal and transverse intervals $P_{MAX}$ of the projections were 300 nm. In the finely roughened antireflection part 2, the projections similar to those shown in FIG. 2 were arranged regularly longitudinally and transversely. The shape $2_{Mt}$ of a tip part Mt of each projection was sharper than the shape $2_{Mb}$ of a bottom part Mb of each depression as shown in FIG. 1(B). The width Wt of the shape $2_{Mt}$ of a tip part Mt of each projection on the boundary line at a level of H/2 was 100 nm and the width Wb of the shape $2_{Mb}$ of a bottom part Mb of each depression on the boundary line was 200 nm.

Comparative Example 1

A forming die was made by repeating a duplicating process twice instead of duplicating a mother plate by performing a duplicating process once. More concretely, the forming die used for forming antireflection structure 10 in Example 1 was used as a duplication die. An 80 µm thick nickel film was formed on the forming die used for forming antireflection structure 10 in Example 1 by an electroplating process, and the nickel film was used as a master plate. An antireflection structure 10 was formed by using the master plate by the same processes as those used for forming the antireflection structure 10 in Example 1.

The dimensions of the finely roughened antireflection part 2 of the thus formed antireflection structure 10 in Comparative example 1 were measured by the same method as that by which the dimensions of the antireflection structure 10 in Example 1 were measured. The height $H_{MIN}$ and the intervals $P_{MAX}$ of the projections of the finely roughened antireflection part 2 were similar to those of the projections of the finely roughened part 2 of Example 1. However, the shape $2_{Mb}$ of a bottom part Mb of each depression was sharper than the shape $2_{Mt}$ of a tip part Mt of each projection.

Example 2

A base plate for a photomask was formed by forming a photoresist film of a photoresist ("S1805", Sipray Co.) on a surface of a 127 mm (5 in.) square 3 mm thick soda glass plate by a spin coating process. The photoresist film was exposed to laser light emitted by an argon ion laser from two directions at 60° to a plane perpendicular to the surface of the glass plate by exposure energy of 120 mJ. Then, the glass plate was turned through an angle of 90°, and the photoresist film was exposed to laser light under the same exposure conditions. Then, the photoresist film thus exposed was subjected to a developing process using a dilute developer ("Developer CONC", Sipray Co.) having a concentration of 32% for twenty-five seconds. Thus, a mother plate provided with a desired finely roughened part having projections and depressions, in which tip parts of the projections were sharper than bottom parts of the depressions. A laser exposure system used for exposing the photoresist film to laser light was "Saber" commercially available from Coherent Co.

Then, an 80 µm thick nickel master plate having the shape of a sheet was formed by the same electroplating process as that used for forming the antireflection structure in Example 1. The master plate was used as a forming die. An antireflection structure 10 in Example 2 was formed by the same processes as those used for forming the antireflection structures 10 in Example 1 by using the forming die.

The dimensions of the finely roughened antireflection part 2 of the thus formed antireflection structure 10 were measured by using an interatomic force microscope. The height $H_{MIN}$ of the projections was 250 nm and the longitudinal and transverse intervals $P_{MAX}$ of the projections were 300 nm. In the finely roughened antireflection part 2, the projections were arranged regularly longitudinally and transversely. The shape $2_{Mt}$ of a tip part Mt of each projection was sharper than the shape $2_{Mb}$ of a bottom part Mb of each depression as shown in FIG. 1(B). The width Wt of the shape $2_{Mt}$ of a tip part Mt of each projection on the boundary line at a level of H/2 was 120 nm and the width Wb of the shape $2_{Mb}$ of a bottom part Mb of each depression on the boundary line was 180 nm.

The shape $2_{Mt}$ of a tip part Mt of each projection was sharper than the shape $2_{Mb}$ of a bottom part Mb of each depression such that, when the center of a section of specific one of the projections in a plane at a level of H/2 is connected by eight straight lines to the centers of sections of the projections surrounding the specific projection, a part, extending in a space outside the sections of the projections, of each of the four straight lines among the eight straight lines was longer than a part, extending in the sections of the projections, of each of the four straight lines.

Comparative Example 2

A forming die was made by repeating a duplicating process twice instead of duplicating a mother plate by performing a duplicating process once. More concretely, the forming die used for forming antireflection structure 10 in Example 2 was used as a duplication die. An 80 μm thick nickel film was formed on the forming die used for forming antireflection structure 10 in Example 1 by an electroplating process, and the nickel film was used as a master plate. An antireflection structure 10 was formed by using the master plate by the same processes as those used for forming the antireflection structure 10 in Example 2.

The dimensions of the finely roughened antireflection part 2 of the thus formed antireflection structure 10 in Comparative example 2 were measured by the same method as that by which the dimensions of the antireflection structure 10 in Example 2 were measured. The height $H_{MIN}$ and the intervals $P_{MAX}$ of the projections of the finely roughened antireflection part 2 were similar to those of the projections of the finely roughened part 2 of Example 2. However, the shape $2_{Mb}$ of a bottom part Mb of each depression was sharper than the shape $2_{Mt}$ of a tip part Mt of each projection.

Performance Evaluation

The transmittances and reflectances of the antireflection structures to light in the waveband of visible light were measured. The antireflection structure in Example 1 had a transmittance of 94.9% and a reflectance of 0.2%, while the antireflection structure in Comparative example 1 had a transmittance of 94.2% and a reflectance of 0.8%. Although the performance of the antireflection structure in Comparative example 1 was satisfactory as compared with that of a structure not provided with any finely roughened antireflection part, the same was inferior to that of the antireflection structure in Example 1. A simple, transparent acrylic resin plate not finished by an antireflection process had a transmittance of 91.8% and a reflectance of 4.0%. The finely roughened antireflection part of the antireflection structure in Example 1 did not diffuse light and the transmittance was improved accordingly.

The antireflection structure in Example 2 had a transmittance of 94.8% and a reflectance of 0.2%, while the antireflection structure in Comparative example 2 had a transmittance of 94.0% and a reflectance of 0.85%. Although the performance of the antireflection structure in Comparative example 2 was satisfactory as compared with that of a structure not provided with any finely roughened antireflection part, the same was inferior to that of the antireflection structure in Example 2.

Thus, the finely roughened antireflection part of the antireflection structure of the present invention prevents reflection of light by the surface of an article. The shape of the finely roughened antireflection part in which the tip parts of the projections are sharper than the bottom parts of the depressions reduces reflection of light effectively. When reflection is reduced, transmittance is increased accordingly. Thus, the use of the antireflection structure as a window plate for a display unit improves the visibility of displayed pictures and improves the efficiency of display light.

What is claimed is:

1. An antireflection structure, comprising:
   a base having a shape of a flat plate; and
   a finely roughened antireflection part formed integrally with the base;
   wherein:
   (1) the finely roughened antireflection part includes a plurality of projections and a plurality of depressions defined by the projections, no other layer covering the plurality of projections and the plurality of depressions such that the surface of the plurality of projections and the plurality of depressions is exposed to the air;
   (2) the projections are distributed such that $P_{MAX} \leq \lambda_{MIN}$, where $P_{MAX}$ is a greatest distance between tips of adjacent projections and $\lambda_{MIN}$ is a shortest wavelength of visible light in a vacuum;
   (3) a horizontal cross-sectional area of the projections increases continuously from the tips of the projections to bottoms of the depressions so that a ratio of the horizontal cross-sectional area of the projections to a cross-sectional area of the finely roughened antireflection part in a plane including the bottoms of the depressions increases continuously from 0% to 100% from the tips of the projections to the bottoms of the depressions;
   (4) a vertical cross-sectional shape of each projection is sharper at a tip part of each projection than at a bottom part of each depression;
   (5) a vertical cross-sectional shape of the finely roughened antireflection part includes only curved edges; and
   (6) the base and the finely roughened part are formed of a same material.

2. The antireflection structure according to claim 1, wherein
   the finely roughened antireflection part meets inequalities: $n_b \geq 1$ and $P_{MAX} \leq \lambda_{MIN}/n_b$, where $n_b$ is the refractive index of the base.

3. The antireflection structure according to claim 1, wherein:
   a vertical cross-section of the finely roughened antireflection part has a height H; and
   a tip part of the vertical cross-section above a level of H/2 has a smaller cross-sectional area than a bottom part of the vertical cross-section below the level of H/2.

4. The antireflection structure according to claim 3, wherein:
   at the level H/2, a vertical cross-section of each projection has a first width and a vertical cross-section of each depression has a second width; and
   the second width is greater than the first width.

5. The antireflection structure according to claim 1, wherein
a vertical cross-sectional shape of each depression is symmetrical.

6. The antireflection structure according to claim 1, wherein
a vertical cross-sectional shape of each projection is asymmetrical.

7. The antireflection structure according to claim 1, wherein
the base comprises a main base portion and a surface base portion, the finely roughened antireflection part being provided on the surface base portion.

8. An antireflection structure, comprising:
a base having a shape of a flat plate; and
a finely roughened antireflection part formed integrally with the base;
wherein:
(1) the finely roughened antireflection part includes a plurality of projections and a plurality of depressions defined by the projections;
(2) the projections are distributed such that $P_{MAX} \leq \lambda_{MIN}$, where $P_{MAX}$ is a greatest distance between tips of adjacent projections and $\lambda_{MIN}$ is a shortest wavelength of visible light in a vacuum;
(3) a horizontal cross-sectional area of the projections increases continuously from the tips of the projections to bottoms of the depressions so that a ratio of the horizontal cross-sectional area of the projections to a cross-sectional area of the finely roughened antireflection part in a plane including the bottoms of the depressions increases continuously from 0% to 100% from the tips of the projections to the bottoms of the depressions;
(4) a vertical cross-sectional shape of each projection is sharper at a tip part of each projection than at a bottom part of each depression; and
(5) the plurality of projections have a cross-sectional shape defined by two opposite sides, each side extending from the tip of the projection to the bottom of the depression, each side having two planar surfaces disposed at an obtuse angle to each other.

9. The antireflection structure according to claim 8, wherein the finely roughened antireflection part meets inequalities: $n_b \geq 1$ and $P_{MAX} \leq \lambda_{MIN}/n_b$, where $n_b$ is the refractive index of the base.

10. The antireflection structure according to claim 8, wherein a tip part of the vertical cross-section above a level of H/2 has a smaller cross-sectional area than a bottom part of the vertical cross-section below the level of H/2.

11. The antireflection structure according to claim 10, wherein at the level H/2, a vertical cross-section of each projection has a first width and a vertical cross-section of each depression has a second width; and
the second width is greater than the first width.

12. The antireflection structure according to claim 8, wherein a vertical cross-sectional shape of each depression is symmetrical.

13. The antireflection structure according to claim 8, wherein a vertical cross-sectional shape of each projection is asymmetrical.

14. The antireflection structure according to claim 8, wherein the base and the finely roughened part are formed of the same material.

15. The antireflection structure according to claim 8, wherein the base comprises a main base portion and a surface base portion, the finely roughened antireflection part being provided on the surface base portion.

16. An antireflection structure, comprising:
a base having a shape of a flat plate; and
a finely roughened antireflection part formed integrally with the base;
wherein:
(1) the finely roughened antireflection part includes a plurality of projections and a plurality of depressions defined by the projections, no other layer covering the plurality of projections and the plurality of depressions such that the surface of the plurality of projections and the plurality of depressions is exposed to the air;
(2) the projections are distributed such that $P_{MAX} \lambda_{MIN}$, where $P_{MAX}$ is a greatest distance between tips of adjacent projections and $\lambda_{MIN}$ is a shortest wavelength of visible light in a vacuum;
(3) a horizontal cross-sectional area of the projections increases continuously from the tips of the projections to bottoms of the depressions so that a ratio of the horizontal cross-sectional area of the projections to a cross-sectional area of the finely roughened antireflection part in a plane including the bottoms of the depressions increases continuously from 0% to 100% from the tips of the projections to the bottoms of the depressions;
(4) a vertical cross-sectional shape of each projection is sharper at a tip part of each projection than at a bottom part of each depression; and
(5) the plurality of projections have a cross-sectional shape including two opposite sides, each side extending from the tip of the projection to the bottom of the depression, each side having two planar surfaces disposed at an obtuse angle to each other.

17. The antireflection structure according to claim 16, wherein the finely roughened antireflection part meets inequalities: $n_b \geq 1$ and $P_{MAX} \lambda_{MIN}/n_b$, where $n_b$ is the refractive index of the base.

18. The antireflection structure according to claim 16, wherein:
a vertical cross-section of the finely roughened antireflection part has a height H; and
a tip part of the vertical cross-section above a level of H/2 has a smaller cross-sectional area than a bottom part of the vertical cross-section below the level of H/2.

19. The antireflection structure according to claim 16, wherein
a vertical cross-sectional shape of each depression is symmetrical.

20. The antireflection structure according to claim 16, wherein a vertical cross-sectional shape of each projection is asymmetrical.

21. The antireflection structure according to claim 16, wherein
the base comprises a main base portion and a surface base portion, the finely roughened antireflection part being provided on the surface base portion.

* * * * *